Dec. 21, 1943.  T. E. PHARES  2,337,301

GAS RANGE OVEN

Filed Aug. 2, 1940

INVENTOR
THOMAS E. PHARES,
BY
ATTORNEYS.

Patented Dec. 21, 1943

2,337,301

UNITED STATES PATENT OFFICE 2,337,301

GAS RANGE OVEN

Thomas E. Phares, Shelbyville, Ind., assignor to Chambers Corporation, Shelbyville, Ind., a corporation of Indiana Application August 2, 1940, Serial No. 349,439

4 Claims. (Cl. 126—39)

My invention relates to gas-range ovens, and more specifically to ovens of the type which have insulated walls and which are provided with ventilation-control means that ventilate the oven when the burner is in operation and shut off ventilation after the burner has been turned off. It is the object of my invention to produce an improved oven burner which will supply heat evenly to the oven and to associate with such burner a ventilation-controlling valve member which, when open, will serve as a deflector controlling the distribution of secondary air to the burner.

In carrying out my invention, I construct the burner substantially in the form of a rectangle having a central opening, a continuous peripheral gas-passage and a continuous series of burner-ports communicating with such passage. This burner is disposed centrally of the oven beneath the floor thereof, and is supplied with a combustible mixture of air and gas through a mixture-passage communicating with the burner near one corner thereof. In the bottom wall of the oven, below the burner, and in one side wall of the oven above the burner, I provide air-admission and air-outlet openings respectively, such openings being controlled by jointly operable valve members. The opening in the bottom wall of the oven is disposed within the limits of the central opening in the rectangular burner, and the valve member associated therewith is in the form of a plate which, when raised to permit the entrance of air into the oven, occupies a substantially horizontal position within the burner and serves as a deflector controlling the supply of secondary air to the burner ports.

Figure 1:
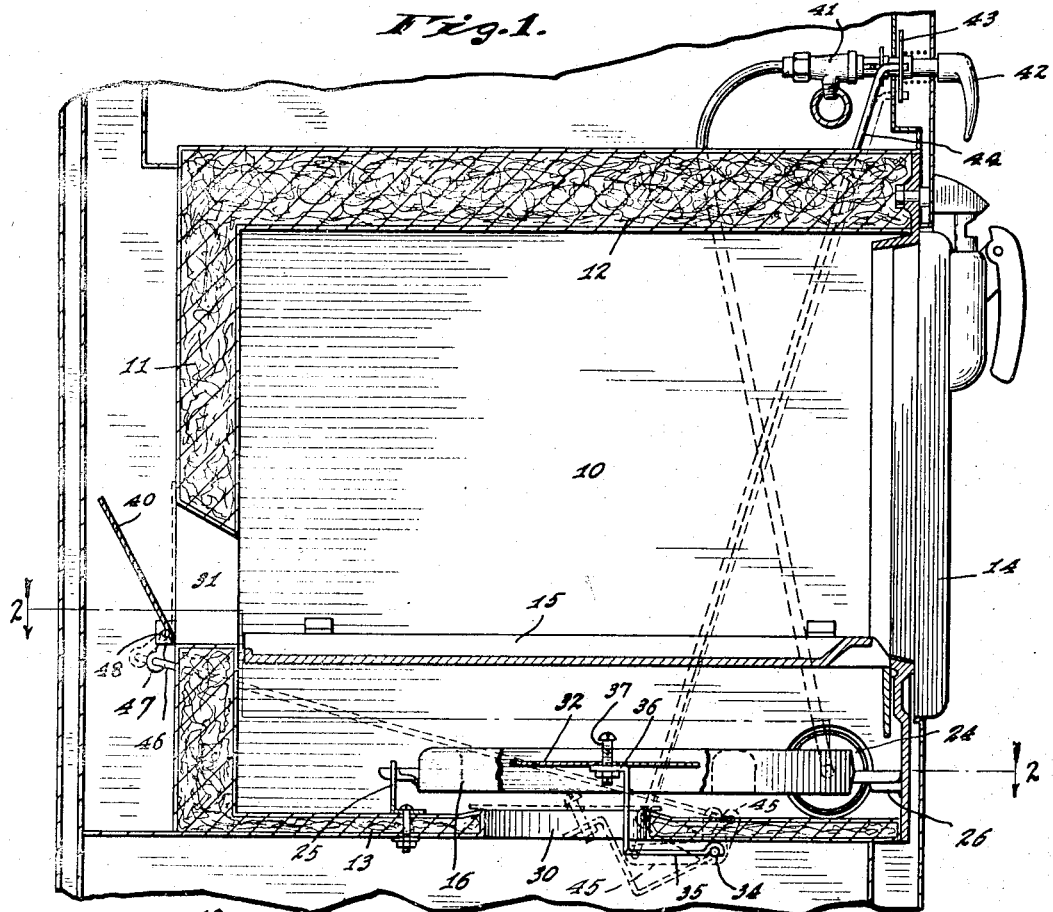
Figure 2:
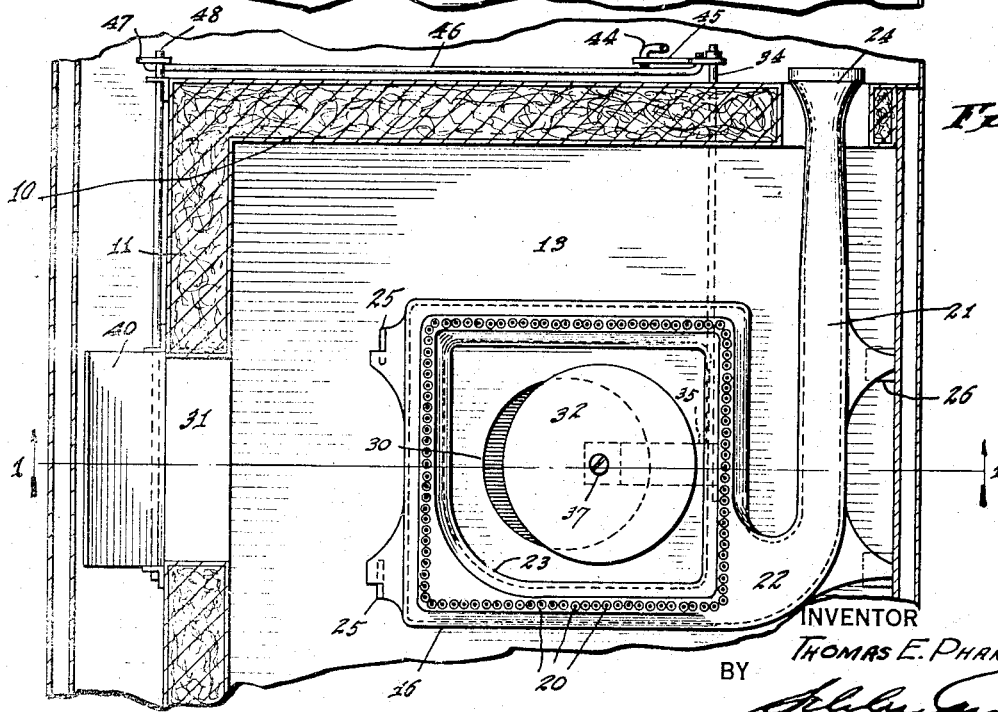

The accompanying drawing illustrates my invention, Fig. 1 being a vertical section through an oven on the line 1—1 of Fig. 2, and Fig. 2 being a horizontal section on the line 2—2 of Fig. 1.

As shown in the drawing, the oven is formed with vertical side walls 10, a rear wall 11, a top wall 12, and a bottom wall 13, all of which are insulated. A door 14, mounted in the front wall of the oven, provides access thereto; and, at about the level of the lower edge of the door 14, the oven is provided with a floor member 15 spaced in the conventional manner from the side and rear walls of the oven to provide for the upward flow of hot gases from the burner 16, which is supported from the bottom wall 13 of the oven beneath the floor member 15.

As will be clear from Fig. 2, the burner is in the form of a rectangle having a central opening and a peripheral gas-passage communicating with a peripheral series of burner ports 20. The burner 16 is supplied with a combustible mixture of gas and primary air through a mixture-conduit 21 which may be formed integral with the burner and which extends from an opening in one of the side walls 10 across the oven in front of the burner, communicating with the latter near the remote front corner thereof. At its point of communication with the burner, the conduit 21 curves and flares as indicated at 22, the outer curved wall smoothly joining the outer wall of the burner-passage at the remote side of the burner and the inner curved wall of the passage being curved through approximately 180° and smoothly joining the front wall of the front stretch of the burner-passage.

At the rear corner of the burner, in rear of the point at which the flared end 22 of the conduit is joined thereto, the inner wall of the burner passage is curved on a relatively large radius as indicated at 23, while the outer wall forms substantially a right-angle. As a result, the cross-sectional area of the burner passage at the corner opposite the point where it joins the mixture passage 21 is of substantially enlarged cross-sectional area. Aside from this one corner, the cross-sectional area of the burner passage is substantially uniform. This construction, with the mixture passage 21 extending across the oven in front of the burner, permits that passage to have the necessary minimum length between the air bell 24 and the burner, while the flared end portion 22 of the mixture passage and the curved inner wall 23 of the burner passage at the rear corner provides an even distribution of gas and primary air throughout the peripheral series of burner ports 20.

The burner 16 is supported at a distance above the bottom wall 13 of the oven by brackets 25 and 26 at the rear and front of the burner respectively. Beneath the large central opening in the burner, the bottom wall 13 of the oven is provided with an air-admission opening 30, which, as shown, is round in shape. The rear wall 11 of the oven is provided with an air-discharge opening 31, the lower edge of which is near the level of the floor-member 15.

For the purpose of controlling ventilation of the oven, I associate with the air admission opening 30 a valve member 32, which, as shown, is a circular disk somewhat larger in diameter than the air-admission opening. This disk is movable between the dotted-line position shown in Fig. 1, in which it covers the opening 30 and prevents the admission of air therethrough and the full-line position shown in Fig. 1 in which it is raised above the bottom wall 13 of the oven into a horizontal position in the plane of the burner. To move the valve member 32 between the positions described, I mount beneath the bottom wall 13 a transverse rock shaft 34 to which there is secured, as by welding, an L-shaped valve-support 35. The valve-support 35 is conveniently formed of a strip of sheet-metal and has its outer end bent to extend substantially horizontally, as indicated at 36, when the valve 32 is open. The valve 36 is provided with a central opening through which there passes loosely a screw 37, such screw extending into and being rigid with the horizontal end portion 36 of the valve-support 35. As will be obvious from Fig. 1, the screw 37 does not clamp the valve member 32 to the end portion 36 of the valve-support.

Desirably, the air outlet opening 31 has associated with it a valve member 40, which is jointly operable with the valve member 32, both such valve members conveniently being operated jointly with the valve 41 which controls the supply of gas to the burner 16. To this end, there may be mounted rigid with the rotatable handle 42 which controls the valve 41 a disk 43 which, at an eccentric point, has an opening for the reception of one end of a link 44. The link 44 extends downwardly and has its lower end connected to one arm of a bell crank 45 rigid with the shaft 34. The other end of the bell crank 45 is connected by a link 46 to a crank 47 rigid with a shaft 48 to which the valve member 40 is secured.

When the valve 41 is closed, and the burner 16 is not operating, the valve members 32 and 40 occupy the dotted-line positions illustrated in Fig. 1, such valve members closing the openings with which they are relatively associated and preventing the flow of air through the oven. When, however, the valve 41 is open, the link 44 moves upward and rocks the shaft 34 and the valve-support 35 rigid therewith in a clockwise position to lift the valve 32 to the full-line position illustrated in Fig. 1. Simultaneously, because of the interconnection provided by the link 46, the shaft 48 is rocked to open the valve-member 40. With both valve members open, air enters the oven through the opening 30 and leaves through the opening 31, a portion of such air being used as secondary air for the burner 16. When the handle 48 is operated to close the gas valve 41, the two valve members 32 and 40 will be restored to the dotted-line positions, the valve member 32 being seated by the force of gravity.

To provide the proper distribution of secondary air through the burner 16, I find it desirable to locate the opening 30 somewhat rearwardly, or toward the air-outlet opening 31, from the center of the burner 16. I also find it advantageous to arrange the valve-support 35, so that the valve member 32 when in open position will be displaced forwardly, or away from the air-outlet opening 31, with respect to the air-admission opening 30. The described locations of the air-admission opening 30 and of the open valve member 32 provide for the burner ports 20 a distribution of secondary air which will result in substantially uniform combustion.

I claim as my invention:

1. In a gas range, an oven, a burner disposed within said oven and near the bottom thereof, said burner being generally rectangular in shape and having a relatively large, generally rectangular central opening and a peripheral gas passage surrounding said opening, said burner having a peripheral series of burner ports communicating with said passage, the bottom wall of said oven being provided with an air admission opening disposed under the central opening in the burner but displaced from the center thereof toward one of the vertical walls of the oven, such wall being provided with an air-outlet opening, and means for controlling the flow of air through the oven, said means comprising a plate adapted to overlie and close said air admission opening and mechanism for raising said plate and supporting it above the bottom wall of the oven and within the central opening of the burner to act as a deflector of the secondary air required for combustion at said burner ports.

2. In a gas range, an oven, a burner disposed within said oven and near the bottom thereof, said burner being generally rectangular in shape and having a relatively large, generally rectangular central opening and a peripheral gas passage surrounding said opening, said burner having a peripheral series of burner ports communicating with said passage, the bottom wall of said oven being provided with an air admission opening disposed under the central opening in the burner, said oven also being provided with an air-outlet opening, and means for controlling the flow of air through the oven, said means comprising a plate adapted to overlie and close said air admission opening and mechanism for raising said plate and supporting it above the bottom wall of the oven and within the central opening of the burner to act as a deflector of the secondary air required for combustion at said burner ports.

3. The invention set forth in claim 2 with the addition that said mechanism is so proportioned that when holding said plate in raised position the plate and opening will be oppositely eccentric relative to the axis of the central opening in the burner.

4. In a gas range, an oven, a burner disposed within said oven and near the bottom thereof, said burner being generally rectangular in shape and having a relatively large, generally rectangular central opening and a peripheral gas passage surrounding said opening, said burner having a peripheral series of burner ports communicating with said passage, the bottom wall of said oven being provided with an air admission opening disposed under the central opening in the burner, and an air-deflecting member disposed in a substantially horizontal position within the central opening of said burner, said air admission opening and said deflecting member being substantially circular and oppositely eccentric relative to the axis of the central burner opening.

THOMAS E. PHARES.